(12) United States Patent
Weber et al.

(10) Patent No.: US 11,652,383 B2
(45) Date of Patent: May 16, 2023

(54) ELECTRICAL MACHINE AND METHOD FOR APPLYING AT LEAST ONE WINDING TO A WINDING SUPPORT OF AN ELECTRICAL MACHINE

(71) Applicant: AUDI AG, Ingolstadt (DE)

(72) Inventors: Korbinian Weber, Ingolstadt (DE); Max Possen, Ingolstadt (DE)

(73) Assignee: Audi AG, Ingolstadt (DE)

( * ) Notice: Subject to any disclaimer, the term of this patent is extended or adjusted under 35 U.S.C. 154(b) by 231 days.

(21) Appl. No.: 17/016,176

(22) Filed: Sep. 9, 2020

(65) Prior Publication Data

US 2021/0075288 A1    Mar. 11, 2021

(30) Foreign Application Priority Data

Sep. 10, 2019    (DE) .......................... 102019124206.1

(51) Int. Cl.
*H02K 3/50*    (2006.01)
*H02K 1/18*    (2006.01)

(52) U.S. Cl.
CPC ............. *H02K 3/505* (2013.01); *H02K 1/182* (2013.01); *H02K 2203/09* (2013.01)

(58) Field of Classification Search
CPC ............ H02K 3/00; H02K 3/34; H02K 3/345; H02K 3/52; H02K 3/522; H02K 3/50;
(Continued)

(56) References Cited

U.S. PATENT DOCUMENTS

| 5,436,520 A | 7/1995 | Huber | |
|---|---|---|---|
| 2011/0243768 A1* | 10/2011 | Taema | H02K 3/522 310/216.115 |

(Continued)

FOREIGN PATENT DOCUMENTS

| EP | 1 821 388 A2 | 8/2007 |
|---|---|---|
| FR | 2991831 | * 12/2013 |

(Continued)

*Primary Examiner* — Tran N Nguyen
(74) *Attorney, Agent, or Firm* — Seed Intellectual Property Law Group LLP

(57) ABSTRACT

An electrical machine with a winding support is provided, which comprises a cylindrical base body and support teeth projecting radially from the base body and has grooves bounded by the base body and in each case two of the support teeth, and at least one winding supported by the winding support, which winding is formed by conductively connected conductor sections, which are each guided through at least one of the grooves of the winding support and project beyond the winding support at the axial end faces of the winding support, wherein a respective clamping ring is arranged at each axial end face of the winding support, wherein each clamping ring forms support sections that each extend radially along a respective axial end face of a respective one of the support teeth and mechanically contact at least parts of the conductor sections guided through the grooves adjacent to the respective support tooth, wherein the respective support section contacts the axial end face of the respective support tooth in a contact region, which is spaced apart from the adjacent grooves.

12 Claims, 4 Drawing Sheets

(58) Field of Classification Search
CPC ........ H02K 3/505; H02K 15/00; H02K 15/04; H02K 15/042; H02K 15/0428; H02K 15/12; H02K 9/00; H02K 9/19
See application file for complete search history.

(56) References Cited

U.S. PATENT DOCUMENTS

2012/0153767 A1* 6/2012 Tang ................. H02K 3/345
310/215
2019/0165634 A1 5/2019 Whaley et al.

FOREIGN PATENT DOCUMENTS

| JP | 2016046971 | * | 4/2016 |
|----|------------|---|--------|
| WO | 98/44617 A1 | | 10/1998 |
| WO | 2015/087128 A2 | | 6/2015 |

* cited by examiner

ELECTRICAL MACHINE AND METHOD FOR APPLYING AT LEAST ONE WINDING TO A WINDING SUPPORT OF AN ELECTRICAL MACHINE

TECHNICAL FIELD

Embodiments of the invention relate to an electrical machine with a winding support, which comprises a cylindrical base body and support teeth projecting radially from the base body and has grooves bounded by the base body and two of the support teeth, and at least one winding supported by the winding support, which winding is formed by conductively connected conductor sections, which are each guided through at least one of the grooves of the winding support and project beyond the winding support at the axial end faces of the winding support, wherein a respective clamping ring is arranged at each axial end face of the winding support, wherein each clamping ring forms support sections that each extend radially along a respective axial end face of one of the support teeth and mechanically contact at least parts of the conductor sections guided through the grooves adjacent to the respective support tooth. Embodiments of the invention also relate to a method for applying at least one winding to a winding support of an electrical machine.

DESCRIPTION OF THE RELATED ART

Windings of electrical machines, in particular of stators, can be constructed in a so-called "hairpin design." In such a case, a mostly rectangular profile wire is first bent into a U-shape or a hairpin shape. A plurality of such hairpins are arranged in a circular manner and their branches are inserted into the grooves of a laminated core. The free ends of the individual hairpins are then rotated in the circumferential direction of the laminated core by a defined angle, wherein in particular all free ends are rotated on a specific diameter or in a specific winding position in the same direction, in particular in a direction opposite to the adjacent position. This process is called "twisting." After twisting, the free ends to be connected are adjacent to one another and can, for example, be welded together in order to connect them conductively. Depending on the desired winding scheme, the connection bridges can then be placed on the winding head, in order to connect the hairpins to form an overall winding. Subsequently, the pin ends can be insulated and the entire stator can be impregnated.

The described technique is frequently used in particular in the automotive sector for the production of electric motors, since it achieves a high degree of automation and a high copper fill factor. At the same time, however, a conventional hairpin winding also results in some disadvantages. A core of laminations is typically used as the winding support or stator body. However, this is without any axial force during the application of the winding, such that gaps that remain between the laminations can arise and remain in the product. This is unfavorable, in particular if direct liquid cooling of the laminated core is to take place, since the gaps can lead to leakages.

In order to prevent damage to the conductors or of used insulation, a finger tool is also possibly used; this is arranged in the region of the end faces of the stator teeth and supports the free ends of the hairpins upon bending. This is removed again after the end of the winding process, with the result that relatively large gaps or free spaces remain between the end face of the laminated core and the winding head. In the case of machines with a liquid-based cooling, a relatively high volume flow of the fluid can penetrate through such gaps into the air gap between the rotor and stator and therein lead to, for example, additional friction losses.

Similar problems may arise when a liquid-based rotor cooling is used, with which cooling fluid exiting the rotor is centrifugally spun against the winding heads of the stator in order to cool the stator. In such a case, any larger volume flows that are present penetrating into the air gap and generating losses there, as explained above, must be avoided. This results in barely any design possibilities in the case of conventionally constructed stators.

The publication WO 2015/087128 A2 discloses an insulator disk that can be arranged on a stator in such a manner that stator tooth covers extend along the stator teeth, wherein an opening between adjacent stator tooth covers has a smaller width than the grooves of the stator. The stator tooth covers support the conductors upon twisting. Although the insulator described can help to avoid or at least reduce some of the problems described above. However, the problem remains that gaps can form in a laminated core during the application of the winding. In addition, the use of the insulating disk described considerably impedes the insertion of insulating paper into the grooves of the stator, such that the use of such insulating disk appears only to be expedient if insulating paper is dispensed with, for example when relatively low voltages are used in the winding.

BRIEF SUMMARY

Embodiments of the invention are therefore based on the object of providing an improved solution for the aforementioned problems, wherein in particular, on the one hand, the formation of gaps in a winding support formed from a laminated core is to be avoided and, on the other hand, a problem-free utilization of insulators inserted into grooves is to be possible.

The object may be achieved in that the respective support section contacts the axial end face of the respective stator tooth in a contact region that is spaced apart from the adjacent grooves.

In other words, the edge region of the end face of the respective support tooth is free in the circumferential direction. For example, a groove edge can be selectively released by a bevel of the support section.

The restriction of the contact region opens in particular the possibility of pushing the clamping rings onto insulating papers or the like that have already been inserted or axially introduced into the grooves in advance. Alternatively, it would also be readily possible to introduce insulating papers or the like axially into the grooves after the clamping rings have already been arranged on the winding support. Due to the limited contact region, they do not hang up in the transition region between the groove and the clamping ring, but can be introduced without problems.

The distance of the groove edge to the support section can lead in particular to the fact that, at the contact point of the respective conductor section to the support section, the conductor section already runs at an angle to the axial direction of the winding support, and can therefore already transmit a force in the axial direction to the respective support section and thus via the clamping ring also to the winding support. Since such a force input can take place via both end faces of the winding support, the winding can thus transmit a clamping force to the base body, which can prevent or at least reduce the formation of gaps when the base body is configured as an axially layered laminate, for example as a laminated core.

The winding support can in particular be a laminated core. The electrical machine may comprise a stator and a rotor, wherein the winding support may be part of the stator. In such a case, the support teeth form the stator teeth. A plurality of windings, for example for three phases of a three-phase current, are typically used in electrical machines. The plurality of windings can all be formed by the conductor sections, wherein in each case only the conductor sections of one respective winding are conductively connected to one another.

The respective support section can widen with increasing distance from the end face in the circumferential direction of the winding support at least in a widening section adjacent to the end face of the winding support. The relatively small width of the support section in the region of the end face enables, as explained above, the easy stringing of the support sections onto existing insulating means inserted into the grooves, for example on insulating paper, or the easy threading of the insulating means. The widening region supports the conductor upon deflection, such that, when twisted, contact of the conductor sections or of the insulating means with the edges between the groove side wall and end face of the winding support can be avoided, or forces occurring can be reduced. Thereby, damage to the insulating means or the insulation of the respective conductor section can be avoided.

The support section may nevertheless be narrower in the circumferential direction at the point of maximum width than the support tooth at the corresponding position in the radial direction. In particular, this can further improve the use of insulating means inserted into grooves and contribute to the formation of axial forces, which press the base body together in order to avoid the formation of gaps.

The conductor sections can in particular be U-shaped conductor brackets, in particular the hairpins mentioned above. These can have two axial sections guided through a respective groove and a connector section connecting them. The free ends of the axial sections projecting beyond the clamping ring can be bent in the circumferential direction, in order to realize the twisting explained above.

At least some of the conductor sections can be elastically deformed in such a manner that they exert a respective axial restoring force in the direction of the winding support onto the support sections of both clamping rings mechanically contacted by them. This can be realized, for example, by pressing the clamping rings against the winding support from both sides during the application of the winding, as will be explained in more detail below, in order, for example, to slightly compress a laminate forming the winding support. After inserting, twisting and connecting the conductor sections, a corresponding bracing can be released, with the result that the winding support attempts to expand in the axial direction. In such a case, it elastically deforms the conductor sections, which correspondingly exert a restoring force. This counteracts further expansion and thus the formation of gaps.

The clamping rings can have, between each two of the support sections, a bushing for the conductor sections guided through a respective groove, which is bounded in the radial direction of the winding support by an inner ring and/or an outer ring. If, for example, the electrical machine is an internal rotor, and the winding heads are cooled as explained at the outset by centrifugal force spinning coolant from openings in the rotor onto the winding heads, an inner ring of the clamping rings can contribute to reducing the fluid volume of coolant entering the gap between the rotor and stator, since the coolant cannot flow unhindered along the conductor sections, but can be stopped at the inner ring. The outer ring can be used in particular to enable tools to engage the clamping rings or at least one of the clamping rings within the framework of manufacturing the electrical machine or applying the winding to the winding support. This will be explained in more detail later with reference to related methods.

The end face of the inner ring and/or the outer ring turned away from the winding support may be inclined toward the bushings. In other words, in the axial direction of the winding support, the end face is closer to the winding support adjacent to the bushing than to the opposite side of the inner and/or outer ring. A funnel is thus formed, through which liquid resin can be guided into the groove within the framework of a trickle impregnation of the winding. This makes it possible to carry out a corresponding impregnation significantly more easily and robustly.

In addition to the electrical machine, embodiments of the invention relate to a motor vehicle comprising an electrical machine. The electrical machine can be, in particular, the drive motor or one of the drive motors of the motor vehicle.

Embodiments of the invention also relate to a method for applying at least one winding to a winding support of an electrical machine, comprising:

providing a winding support, which comprises a cylindrical base body and support teeth projecting radially from the base body and which has grooves bounded by the base body and in each case two of the support teeth, arranging a respective clamping ring on both axial end faces of the winding support, such that support sections of the respective clamping ring each extend radially along a respective axial end face of one of the support teeth, wherein the respective support section contacts the respective end face in a contact region that is spaced apart from the adjacent grooves, axially inserting conductor sections into at least one of the grooves, bending at least parts of the conductor sections guided through at least one of the grooves in the circumferential direction of the winding support, so as to mechanically contact one of the support sections extending along the end face of one of the support teeth adjacent to the respective groove, and establishing a conductive connection between at least some of the conductor sections, in order to provide the winding.

The procedure described herein can largely correspond to the hairpin winding already explained at the outset. In contrast to the procedure described there, however, the clamping rings are additionally arranged on the winding support before inserting the conductor sections. In addition to the advantages already explained, this makes it possible to dispense with the use of a separate finger tool. Since the clamping rings remain on the wound winding support or in the electrical machine, the problem explained above, that relatively large gaps remain between the winding support and the winding head, through which coolant can enter between the rotor and stator and can additionally cause losses, is thus avoided.

The conductor sections may be U-shaped or have a hairpin shape, and two branches formed by a connector section are inserted into grooves differing from one another. The free ends of the branches are bent in the circumferential direction by twisting as described at the outset. Due to the different bending directions for different winding layers or circumferential radii, the free ends to be connected to one another are adjacent to one another, such that they can easily be connected by welding, soldering or the like. If, after bending or twisting or after connecting, the conductor sections also contact a respective support section on that side of the winding support where the connecting takes place, an axial force can result on both clamping rings in the direction of the winding support, as already explained above, whereby the formation of gaps in the winding support can be suppressed.

In principle, the conductor sections can be introduced into the grooves separately one after the other. Typically, however, as is known in principle for hairpin windings, the conductor sections are first combined to form a so-called "pin basket," which is then inserted or pressed in axially.

Prior to the arrangement of the clamping rings on the winding support or between the arrangement of the clamping rings on the winding support and the insertion of the conductor sections, insulating means, in particular groove insulating paper, can be inserted axially into the grooves in such a manner that they project axially beyond the clamping rings on both sides after the arrangement of the clamping rings on the winding support. As already explained, the narrow contact region, that is, the use of relatively narrow support sections or a bevel or taper of the support sections on the side of the winding support, allows the clamping ring to be easily pushed onto a previously inserted insulating means or enables the easy insertion of an insulating means, without it getting caught in the transition region between the winding support and the clamping ring.

The support sections of at least one of the clamping rings can be connected by an inner ring and/or by an outer ring, wherein the inner ring and/or the outer ring has recesses and/or projections, to which a tool engages in one part of the method after the arrangement of the clamping rings on the winding support, in order to hold or handle the winding support. For example, the outer ring can have an outer toothing in order to enable the easy gripping of the tool. This can also serve to stabilize the winding support against twisting upon the bending or twisting of the conductor sections. The inner ring may be connected to the radially inner end of the support sections and the outer ring to the radially-distal end thereof. The support sections and the inner and/or outer ring can be formed in one piece and can be produced, for example, by injection molding.

At least during the insertion of the conductor sections and/or the bending of the conductor sections and/or the establishment of the conductive connection, the tool or a tool can engage both clamping rings and press the clamping rings against the respective end face of the winding support. As a result, for example, if the winding support is formed from a laminate, the formation of gaps during the mentioned actions is prevented. After bending or connecting the conductor sections, they can apply a clamping force to the clamping rings, as explained above. Thereby, the formation of gaps can be avoided or reduced even after the tool has been separated.

At least parts of the conductor sections may have two axial sections and a connector section connecting them, wherein the axial sections are inserted into different grooves upon the insertion of the conductor sections, wherein, at least during the bending of the conductor sections and/or the establishment of the conductive connection, the or a tool engages the connector sections and on the clamping ring arranged on the side of the winding support turned away from the connector sections, in order to apply a force to the connector sections in the direction of such clamping ring and vice versa.

For example, the connector sections can be supported on a plate, and a ring, ring section or the like can engage the clamping ring arranged on the connection side of the winding support, in order to apply a force in the direction of the plate or vice versa. The connector sections can bear against one or more of the supporting sections of that clamping ring which is arranged on the side of the winding support turned towards the connector sections. The force transmitted to the connector sections is thus transmitted at least partially to such clamping ring and thus to the end face of the winding support. Thus, in this case as well, both clamping rings are used to compress the winding support, thus achieving the advantages already explained above.

The clamping rings may have, between any two of the support sections, a bushing for the conductor sections guided through a respective groove, which is bounded in the radial direction of the winding support by the or an inner ring and/or by the or an outer ring, wherein the end face of the inner ring and/or the outer ring turned away from the winding support is inclined towards the bushings, wherein the winding is impregnated by dropping liquid resin onto such end face of the inner ring and/or outer ring. As already explained above, the beveled end faces can form a funnel or an insertion aid for the resin into the groove or for filling of groove insulating paper. Thereby, the process of resin insertion and hence the resin filling factor in the groove can be improved. The goal of such a conventional impregnation of windings is to seal all cavities between the winding support, the optionally used groove insulating paper and the conductor sections within the grooves and possibly also in the winding head. However, in the case of conventional winding supports, this is often not possible completely or only with a high expenditure, without the clamping rings that form funnels as described above.

BRIEF DESCRIPTION OF THE SEVERAL VIEWS OF THE DRAWINGS

Additional advantages and individual details result from the embodiments illustrated in the drawings.

DETAILED DESCRIPTION

Figure 1:
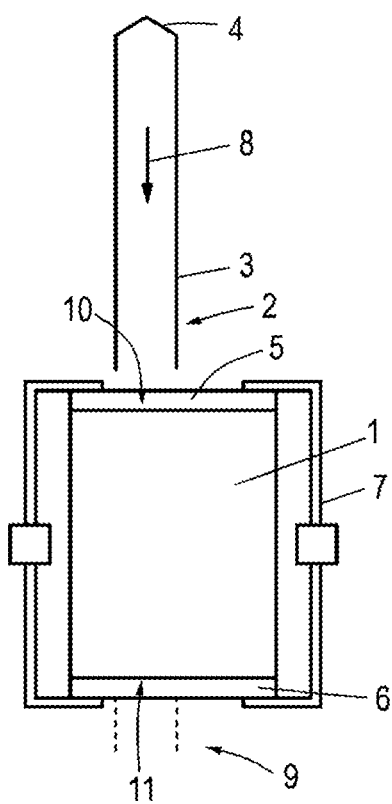
FIG. 1 illustrates an intermediate state of an embodiment of a method.

FIG. 1 schematically shows an intermediate state within the framework of applying a winding to a winding support 1 of an electrical machine. In particular, windings can be applied to a stator as winding support 1. One possibility known for applying corresponding windings is the application of a so-called "hairpin winding." As illustrated schematically in FIG. 1 by the arrow 8, conductor sections 2 that have two axial sections 3 and one connector section 4 are introduced axially into grooves of the winding support 1 not illustrated in FIG. 1. The free ends 9 of the axial sections 3 that extend beyond the winding support 1 after insertion of the conductor sections 2 into the grooves are illustrated in dashed lines in FIG. 1.

After the conductor sections 2 have been inserted into the winding support 1, the free ends 9 are bent in the circumferential direction, wherein it is typically the case that all free ends 9, which lie on the same radius or in the same winding position, are bent in the same direction in the circumferential direction, wherein free ends 9 in adjacent layers are bent in opposite directions in the circumferential direction. After such "twisting" of the free ends, free ends 9 to be connected are adjacent to one another and can be welded or soldered, for example.

Although, for reasons of clarity, FIG. 1 shows only a single conductor section 2, which is inserted axially, in conventional methods for the hairpin winding of a winding support 1, a large number of corresponding conductor sections are first formed into a basket, which is then inserted together axially into the winding support 1. Methods for the hairpin winding of a winding support 1 are known in principle and are therefore not to be explained in detail.

The winding support 1 is typically formed from a laminate of laminated cores, which are laminated in the axial direction of the winding support 1, that is to say in the vertical direction in FIG. 1. With conventional methods for hairpin winding, the winding support 1 is force-free during winding in the axial direction, as a result of which gaps can form between the individual sheets of such a laminate. This is disadvantageous in particular if the winding support 1 in the electrical machine is to be cooled directly by liquid, since leakages of the cooling fluid can occur through the gaps.

In order to avoid this, as shown in FIG. 1, clamping rings 5, 6 are arranged on the axial end faces 10 11 of the winding support 1, to which a tool 7 illustrated only schematically engages in order to press it in the direction of the winding support 1, so that the winding support 1 is pressed together in the axial direction and thus the formation of gaps is suppressed. As will be explained in detail below, even after the winding has been applied and the tool 7 has been released, a force can still be applied via the clamping rings 5, which compresses the winding support 1 in the axial direction, which also makes it possible to suppress the formation of gaps at later points in time, for example during the operation of the electrical machine.

Figure 2:
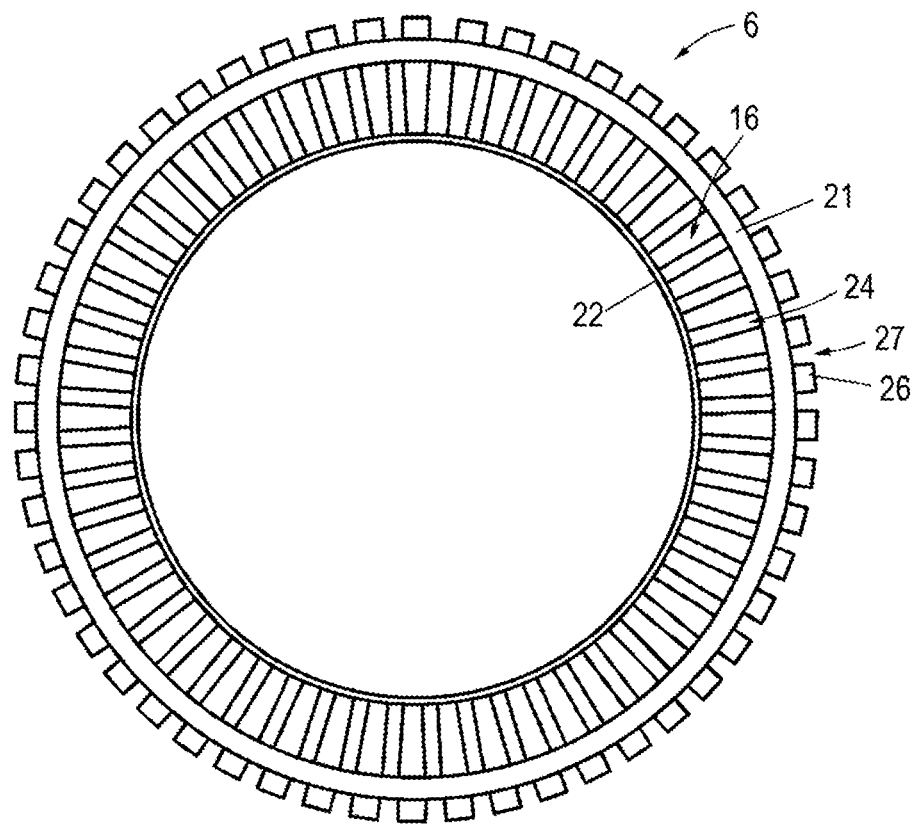
FIG. 2 illustrates a clamping ring used in an embodiment of an electrical machine.
Figure 3:
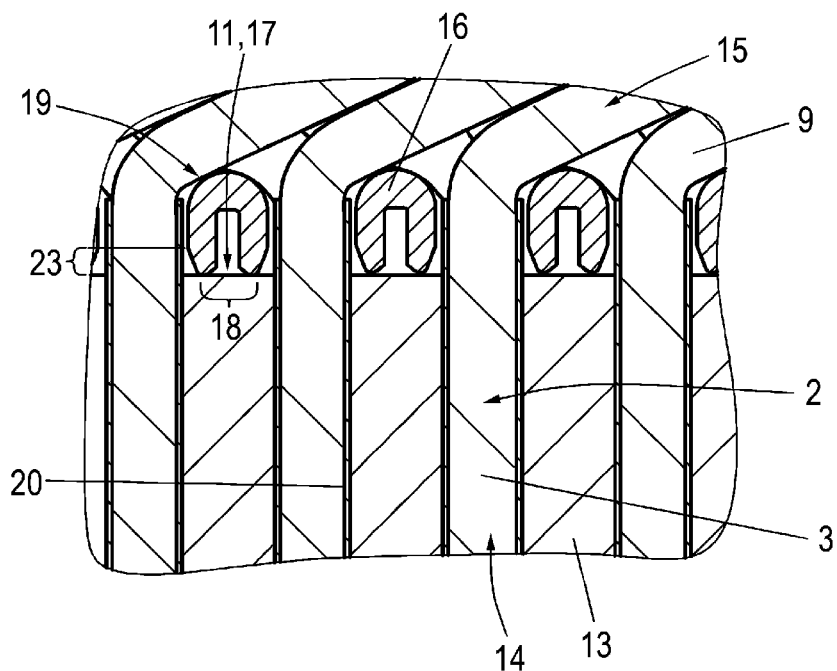
FIGS. 3 and 4 illustrate detailed views of an embodiment of an electrical machine.
Figure 4:
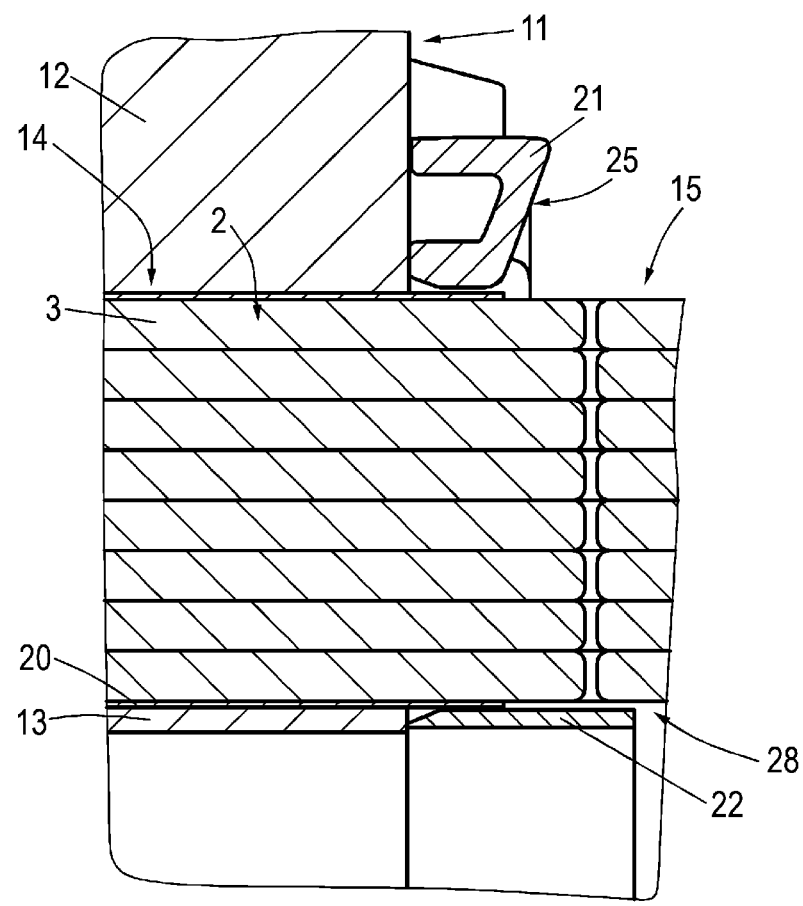

FIG. 2 shows a possible embodiment of the clamping rings 5, 6 using the example of the clamping ring 6, and FIGS. 3 and 4 show in sectional detailed views the working together of the clamping rings 5, 6 with the respective end face 10 11 and the winding 15 using the example of the end face 11.

The winding support 1 is formed from a cylindrical base body 12 and support teeth 13 projecting radially from the base body 12. The base body 12 and, in each case, two of the support teeth 13 each form a groove 14, wherein axial sections 3 of a plurality of conductor sections 2 are arranged in the grooves 14.

In order to, on the one hand, suppress the formation of gaps in the winding support 1 as explained and, on the other hand, to support the conductor sections 3 upon bending in the circumferential direction, such that a separate finger tool can be dispensed with, the clamping rings 5, 6 each have a plurality of support sections 16, each of which extends radially along a respective axial end face 17 of the support teeth 13 and which makes mechanical contact with at least parts of the conductor sections 2 guided by the grooves 14 adjacent to the respective support tooth 13, as illustrated, for example, in region 19.

The support sections 16 contact end faces 17 of the support teeth 13 exclusively in a contact region 18 that is spaced apart from the adjacent grooves 14 in the circumferential direction of the winding support 1. This results, on the one hand, in the advantage that, in the region 19 in which the respective conductor section 2 contacts the respective support section 16, the conductor section 2 already runs in a manner angled to the axial direction of the winding support 1. Thus, a force is transmitted to the support section 16 in the axial direction. In particular, if, as explained above with reference to FIG. 1, the base body 1 has been compressed with the assistance of the tool 7 at least during the twisting of the conductor sections 2 and/or during the connection of the free ends 9 of the different conductor sections 2, it is possible that the conductor sections 2 are pretensioned in the wound winding support 1, by which, in the region of the end face 10 by the connector section 4 and in the region of the end face 11 through the bent connected free ends 9, the individual support sections 16 are pressed in the direction of the respective end faces 17 of the respective stator tooth 13. Since the support sections 16 are connected to one another, for example, by an outer ring 21 and an inner ring 22, the entire clamping rings 5, 6 are pressed relative to one another by the elastic pretensioning of the conductor sections 2 and thus compress the winding support 1 in the axial direction, thereby suppressing the formation of gaps even in the completely wound state of the winding support 1.

An additional advantage of the relatively narrow design of the contact region 18 is that, even when the clamping rings 5, 6 are used, an insulating means 20, in particular insulating paper inserted into the grooves 14, can also be used without problems. This can in particular already be inserted into the grooves or inserted axially into the latter before the clamping rings 5, 6 are arranged on the winding support 1. Due to the relatively narrow contact region 18, the clamping rings can easily be threaded onto the insulating means 20 already arranged in the grooves 14. Alternatively, it would also be possible, without any problems, for example, to insert the insulating means 20 axially into the winding support 1 after arranging the clamping rings 5, 6, since the relatively narrow contact region 18 prevents the insulating means 20 from catching on the transition region between the respective stator tooth 13 and the respective support section 16 upon insertion.

In order nevertheless to avoid forces that are caused upon the bending of the free ends 9 acting on the respective conductor sections 3 or the insulating means 20 in the region of an edge of the respective stator tooth 13, it is advantageous, as shown in FIG. 3, if the respective support section 16 widens in a widening section 23 adjacent to the end face 11 of the winding support with increasing distance from the end face in the circumferential direction of the winding support.

The clamping rings 5, 6 each have a bushing 24 for the conductor sections 2 between two of the support sections 16. This is bounded in the radial direction of the winding support 1 by the inner ring 22 and the outer ring 21. In addition to the connection of the support sections 16, the inner and outer ring 21 22 can also serve further purposes. If, for example, the winding head 28, that is, that region in the winding 15 that projects beyond the clamping rings 5, 6, is cooled by spraying the inside of winding head 28 with coolant via a rotor shaft cooling system, the problem with conventional electrical machines is that the coolant flows at least partially along the conductor sections 2 into the gap between the rotor and the stator, where it can cause additional losses. The inner ring 22 can contribute to preventing or at least suppressing such a flow of cooling fluid into the gap between the rotor and stator.

In electrical machines, the windings are typically to be impregnated after application. One approach to this is to apply liquid resin to the winding heads 28 and in the region of the inlets of the grooves 14. The low-viscosity resin is drawn into the windings by capillary action and hardens there. Thereby, in the ideal case, all cavities between the laminated core, the groove insulating paper and the conductor are to be filled. However, this can only be achieved with a high technical outlay with conventional winding supports. In order to improve a corresponding impregnation, the end face 25 of the outer ring 21 can be inclined towards the bushings 24 and thus forms a type of funnel for liquid resin, in order to support the impregnation.

As already schematically illustrated in FIG. 1, it is advantageous if a tool 7 can engage the clamping rings 5, 6. On the one hand, this is intended to be able to build up an axial pressure as explained and, on the other hand, can serve to block the twisting of the winding support 1 upon the bending of the free ends 9 of the conductor sections 2 in the circumferential direction. In order to enable a robust tool engagement, the clamping ring 6 shown in FIG. 2 has an outer toothing, that is to say projections 26 and recesses 27, on the outer ring 21, to which the tool 7 can engage.

Figure 5:
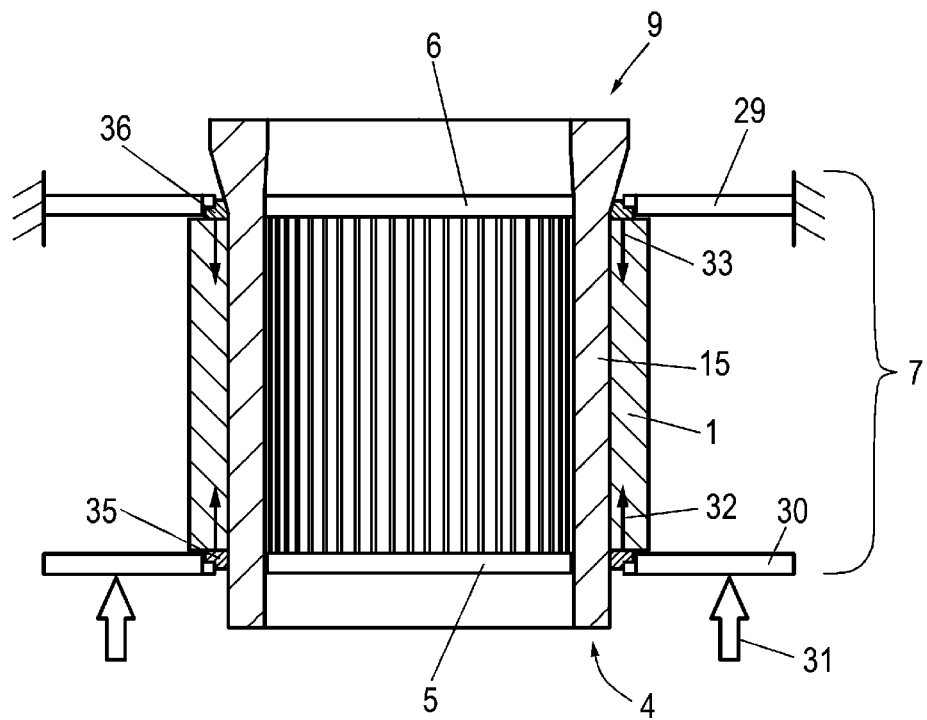
FIGS. 5 and 6 illustrate a clamping of the winding support between two clamping rings in different embodiments of a method.
Figure 6:
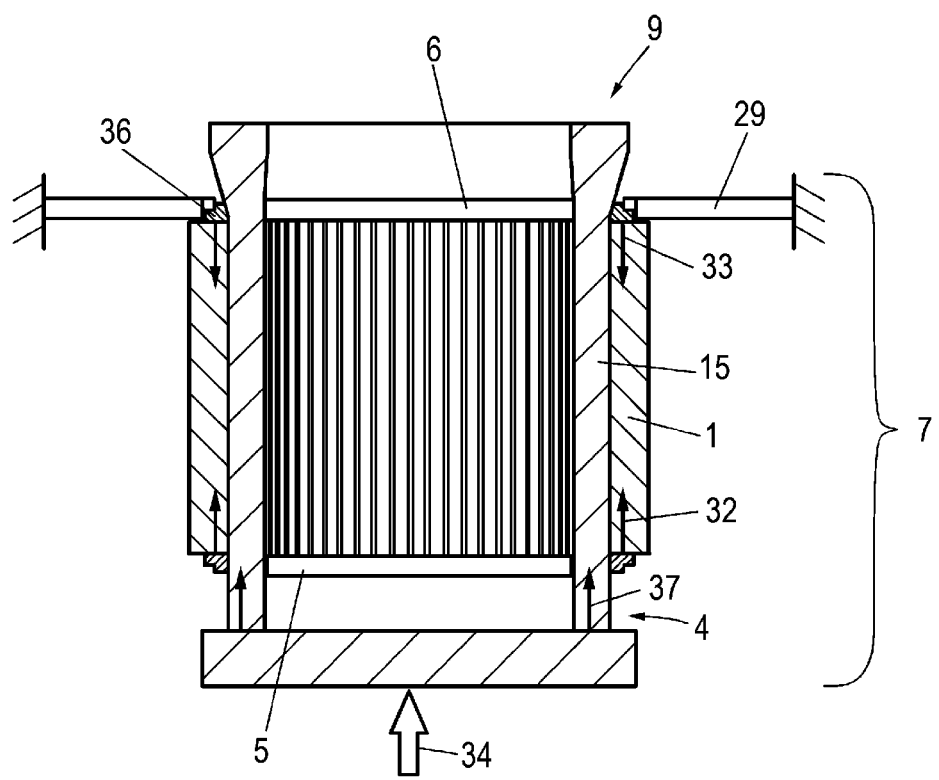

FIGS. 5 and 6 show sectional views of various approaches of compression of the laminated core by a respective tool 7. In such a case, the procedure illustrated in FIG. 5 substantially corresponds to the procedure already schematically illustrated in FIG. 1, wherein, in FIG. 5, the winding 15 has already been introduced into the winding support 1. The tool 7 is formed by a fixed plate 29 and a movable plate 30, wherein the plates 29, 30 have apertures for receiving the winding 15, as illustrated in FIG. 5. The plates 29, 30 engage the projections 34, 35 of the clamping rings 5, 6, such that, when a force is applied to the movable plate 30 as illustrated by arrows 31, a force is applied to the winding support 1 on the one hand via the movable plate 30 and the clamping ring 5 as illustrated by arrow 32, and on the other hand via the fixed plate 29 and the clamping ring 6, as illustrated by arrows 33. This enables the compression of the winding support 1 in the axial direction, in order to avoid the formation of gaps, as explained above.

FIG. 6 shows a modification of the tool 7, which differs from the tool used in FIG. 5 in that the movable plate 30 has no recess and does not directly contact the clamping ring 5, but instead the connector sections 4 of the conductor sections 2. However, since the two axial sections 3 of a respective conductor section 2 are guided through different bushings 24 of the clamping ring 5, the force illustrated schematically by arrows 37 on the connector sections 4 also leads to a force input into the clamping ring 5 and thus on the winding support 1, as illustrated by arrow 32. Thus, even in the case of FIG. 6, as has already been explained in detail in FIG. 5, forces 32, 33 can be introduced into the winding support 1, in order to compress it axially. However, the approach illustrated in FIG. 6 can be advantageous since, for example, the same tool 7 can be used for compressing the winding support 1, which tool is also used to insert or press the conductor sections 3 or a basket formed from them axially into the winding support 1.

Figure 7:
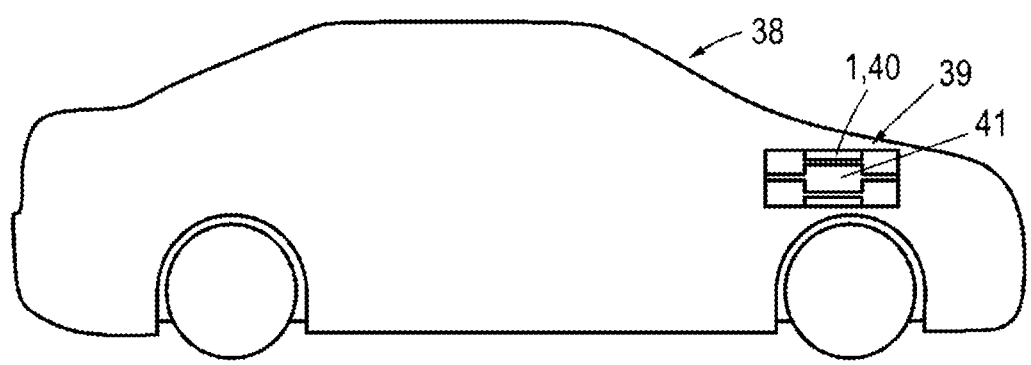
FIG. 7 illustrates an embodiment of a motor vehicle.

FIG. 7 shows an embodiment of a motor vehicle 38, which comprises an electrical machine 39 which may be, for example, the drive motor. The electrical machine 39 has a stator 40 and a rotor 41, wherein in particular the stator 40 is formed by a winding support 1 which has been wound as explained above.

German patent application no. 10 2019 124 206.1, filed Sep. 10, 2019, to which this application claims priority, is hereby incorporated herein by reference in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electrical machine, comprising:
a winding support including a cylindrical base body, support teeth projecting radially from the base body, and grooves bounded by the base body and in each case two of the support teeth; and
at least one winding supported by the winding support, wherein the winding is formed by conductively connected conductor sections, wherein the conductively connected conductor sections are each guided through at least one of the grooves of the winding support and project beyond the winding support at axial end faces of the winding support,
wherein a respective clamping ring is arranged at each axial end face of the winding support, wherein each clamping ring forms support sections that each extend radially along a respective axial end face of a respective one of the support teeth and mechanically contact at least parts of the conductor sections guided through the grooves adjacent to the respective support tooth, and
wherein the respective support section contacts the axial end face of the respective support tooth exclusively in a contact region, wherein the contact region is spaced apart from the adjacent grooves.

2. The electrical machine according to claim 1, wherein the respective support section widens with increasing distance from the end face in a circumferential direction of the winding support at least in a widening section of the respective support section adjacent to the end face of the winding support.

3. The electrical machine according to claim 1, wherein at least some of the conductor sections are elastically deformed in such a manner that the at least some of the conductor sections exert a respective axial restoring force in a direction aligned with the winding support onto the support sections of both clamping rings mechanically contacted by the at least some of the conductor sections.

4. The electrical machine according to claim 1, wherein the clamping rings have, between each two of the support sections, a bushing for the conductor sections guided through a respective groove, wherein the bushing is bounded in a radial direction of the winding support by an inner ring and/or an outer ring.

5. The electrical machine according to claim 4, wherein the end face of the inner ring and/or the outer ring turned away from the winding support may be inclined toward the bushings.

6. The electrical machine according to claim 1, wherein the electrical machine is a component of a motor vehicle.

7. A method of applying at least one winding to a winding support of an electrical machine, comprising: providing a winding support that comprises a cylindrical base body and support teeth projecting radially from the base body and the winding support has grooves bounded by the base body and in each case two of the support teeth, arranging a respective clamping ring on each axial end face of the winding support, such that support sections of the respective clamping ring each extend radially along a respective axial end face of one of the support teeth, wherein the respective support section exclusively contacts the respective end face in a contact region that is spaced apart from the adjacent grooves, axially inserting conductor sections into at least one of the grooves, bending at least parts of the conductor sections guided through at least one of the grooves in the circumferential direction of the winding support, so as to mechanically contact one of the support sections extending along the end face of one of the support teeth adjacent to the respective groove, and establishing a conductive connection between at least some of the conductor sections, in order to provide the winding.

8. The method according to claim 7, wherein, prior to the arrangement of the clamping rings on the winding support or between the arrangement of the clamping rings on the winding support and the insertion of the conductor sections, groove insulating papers are inserted axially into the grooves in such a manner that they project axially beyond the clamping rings on both sides after the arrangement of the clamping rings on the winding support.

9. The method according to claim 7, wherein the support sections of at least one of the clamping rings are connected by an inner ring and/or by an outer ring, wherein the inner ring and/or the outer ring has recesses and/or projections; wherein a tool engages to the inner ring and/or the outer ring after the arrangement of the clamping rings on the winding support, in order to hold or handle the winding support.

10. The method according to claim 7, wherein at least during the insertion of the conductor sections and/or the bending of the conductor sections and/or the establishment of the conductive connection, a tool engages both clamping rings and presses the clamping rings against the respective end faces of the winding support.

11. The method according to claim 7, wherein at least parts of the conductor sections may have two axial sections and a connector section connecting them, wherein the axial sections are inserted into different grooves upon the insertion of the conductor sections, wherein, at least during the bending of the conductor sections and/or the establishment of the conductive connection, a tool engages the connector sections and the clamping ring arranged on the side of the winding support turned away from the connector sections, in order to apply a force to the connector sections in the direction of such clamping ring and in order to apply a force to such clamping ring in the direction of the connector sections.

12. The method according to claim 7, wherein the clamping rings have, between any two of the support sections, a bushing for the conductor sections guided through a respective groove, wherein the bushing is bounded in a radial direction of the winding support by an inner ring and/or by an outer ring, wherein the end face of the inner ring and/or the outer ring turned away from the winding support is inclined towards the bushings, wherein the winding is impregnated by dropping liquid resin onto such end face of the inner ring and/or outer ring.

* * * * *